(12) United States Patent
Leitner

(10) Patent No.: US 8,877,873 B2
(45) Date of Patent: Nov. 4, 2014

(54) IMPREGNATION WITH HYBRID RESINS

(75) Inventor: Paul Leitner, Tiefgraben (AT)

(73) Assignee: Kaindl Decor GmbH, Wals (AT)

( * ) Notice: Subject to any disclaimer, the term of this patent is extended or adjusted under 35 U.S.C. 154(b) by 0 days.

(21) Appl. No.: 13/002,157

(22) PCT Filed: Jul. 1, 2009

(86) PCT No.: PCT/EP2009/058268
§ 371 (c)(1),
(2), (4) Date: Dec. 30, 2010

(87) PCT Pub. No.: WO2010/000781
PCT Pub. Date: Jan. 7, 2010

(65) Prior Publication Data
US 2011/0111241 A1 May 12, 2011

(30) Foreign Application Priority Data
Jul. 1, 2008 (DE) .................. 10 2008 031 082

(51) Int. Cl.
| C08F 283/06 | (2006.01) |
|---|---|
| C08J 5/24 | (2006.01) |
| C08L 61/32 | (2006.01) |
| C08L 61/30 | (2006.01) |
| B32B 27/10 | (2006.01) |
| C08L 61/24 | (2006.01) |
| C08L 61/28 | (2006.01) |
| C08L 67/06 | (2006.01) |
| E04F 15/02 | (2006.01) |

(52) U.S. Cl.
CPC . *B32B 27/10* (2013.01); *C08J 5/24* (2013.01); *C08L 67/06* (2013.01); *C08L 61/32* (2013.01); *C08L 61/30* (2013.01); *C08J 2361/06* (2013.01); *C08L 61/24* (2013.01); *C08J 2367/06* (2013.01); *E04F 15/02* (2013.01); *C08L 61/28* (2013.01)
USPC ............ 525/401; 525/398; 525/437; 525/447

(58) Field of Classification Search
USPC .................................. 525/398, 401, 437, 447
See application file for complete search history.

(56) References Cited

U.S. PATENT DOCUMENTS

| 4,002,781 A | | 1/1977 | Fock et al. |
|---|---|---|---|
| 5,047,260 A | * | 9/1991 | Durand .......................... 427/508 |
| 2007/0207296 A1 | | 9/2007 | Eisermann |
| 2008/0199672 A1 | | 8/2008 | Ruhdorfer |
| 2009/0130377 A1 | * | 5/2009 | Samanta et al. .............. 428/113 |

FOREIGN PATENT DOCUMENTS

| EP | 0 004 053 | | 9/1979 |
|---|---|---|---|
| EP | 0 152 781 | | 8/1985 |
| GB | 500 357 | | 2/1939 |
| GB | 1 383 993 | | 2/1974 |
| JP | 6 316050 | | 11/1994 |
| JP | 9 300553 | | 11/1997 |
| JP | 9 327306 | | 12/1997 |
| WO | WO 0198414 A1 | * | 12/2001 |
| WO | 2006/119950 | | 11/2006 |
| WO | WO 2007020657 A1 | * | 2/2007 |

OTHER PUBLICATIONS

Mateev M M et al: "Interpenetrating polymer networks and polymer blends with anomalous behavior of the viscoelastic functions" International Journal of Materials and Product Technology 1994 Inderscience Enterprises Ltd, vol. 9, Nos. 4-6, 1994, pp. 310-322, XP009122217.
Translation of Russian Office Action conducted in counterpart Russian Appln. No. 2011103425.

* cited by examiner

*Primary Examiner* — Robert Jones, Jr.
(74) *Attorney, Agent, or Firm* — Greenblum & Bernstein, P.L.C.

(57) ABSTRACT

The invention relates to a hybrid resin, which is suitable in particular for impregnating paper webs. The hybrid resin according to the invention can be advantageously used for improving the mechanical properties of counteracting layers in multilayer boards.

13 Claims, 1 Drawing Sheet

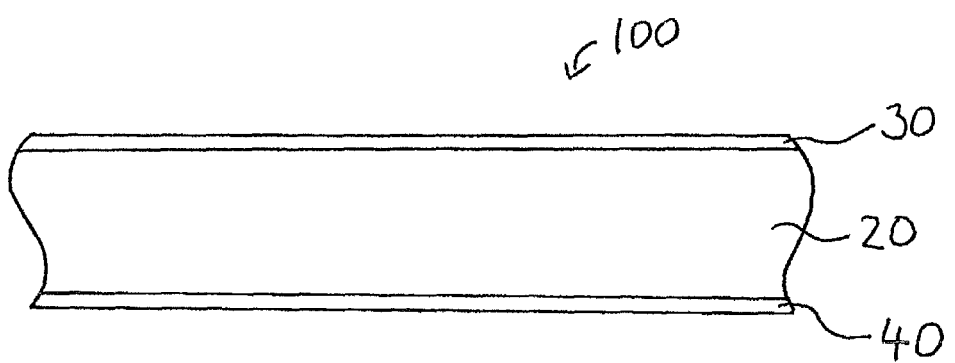

IMPREGNATION WITH HYBRID RESINS

CROSS-REFERENCE TO RELATED APPLICATIONS

The present application is a U.S. National Stage of International Patent Application No. PCT/EP2009/058268 filed Jul. 1, 2009 which published as WO 2010/000781 on Jan. 7, 2010, and claims priority of German Patent Application No. 10 2008 031 082.4 filed Jul. 1, 2008.

BACKGROUND OF THE INVENTION

1. Field of the Invention

The invention relates to a hybrid resin, which is suitable in particular for impregnating paper webs. The hybrid resin according to the invention can be used advantageously for improving the mechanical properties of counteracting layers in multilayer boards.

2. Discussion of Background Information

It is known to coat wood materials such as chipboards, fiberboards, for example, MDF boards (medium density fiberboard) or HDF boards (high density fiberboard) or OSB boards (oriented structural board) with decorative papers, which are preferably impregnated with amino resins. Furthermore, it is known to coat continuous pressure laminates (CPL), which are formed by laying several paper layers on top of one another, with decorative papers, which are preferably impregnated with amino resins. The decorative papers used for this purpose generally have a weight per unit area of 30-140 g/m². Usually, the resins used for impregnating the paper webs are polycondensation products of melamine with formaldehyde. However, polycondensation products are also used, which have a mixed polycondensation of urea and/or melamine with formaldehyde.

To compensate for the pulling effect exerted on the material board by the layer impregnated with resin, usually a counteracting layer is applied to the opposite side of the material board. Melamine formaldehyde resins, for example, are used as standard impregnation for conventional counteracting layer impregnants. However, these resins are expensive, so that alternatives are sought.

Melamine urea formaldehyde resins are used in various fields, for example, for waterproof gluing of wood materials or for the core impregnation of decorative papers. Compared to pure melamine resins, they have economic advantages in particular. However, in various areas they cannot replace pure melamine formaldehyde resins, since the mechanical and chemical properties of MUF resins are poorer in a direct comparison and thus are disadvantageous. For example, MUF resins do not develop the necessary pulling effect to produce counteracting impregnants for laminate floors in order to balance out the melamine surface with the same use of materials. Accordingly, either pure melamine formaldehyde resins were used as counteracting impregnants, or if MUF resins were used, very large amounts of resin were necessary, which has technical as well as economic disadvantages.

SUMMARY OF THE INVENTION

The present invention therefore aims to provide a resin system, which is more cost-effective than melamine formaldehyde resins and nevertheless has sufficient mechanical properties to be used as a counteracting impregnation.

According to the invention, there is provided a resin system comprising
(i) A urea formaldehyde resin, a melamine formaldehyde resin and/or a melamine urea formaldehyde resin and
(ii) An unsaturated polyester resin.

According to the invention, it was determined that through the addition of an unsaturated polyester resin to a resin system comprising a urea formaldehyde resin, a melamine formaldehyde resin and/or a melamine urea formaldehyde resin a clear improvement of the technical properties and in particular of the strength compared to conventional MUF resins (melamine urea formaldehyde resins or melamine urea formaldehyde condensates) is obtained. With the resin system according to the invention the same properties can thereby be realized as with more expensive melamine resins or better technical properties can be realized compared to similarly favorable MUF resins.

The resin system according to the invention, which relates to a hybrid resin, that is, a resin that is composed of at least two components, comprises as component (i) a urea formaldehyde resin (UF resin), a melamine formaldehyde resin (MF resin) and/or a melamine urea formaldehyde resin (MUF resin). The resins are respectively polycondensates. Preferably, component (i) contains at least a certain proportion of resin derived from urea, in particular a proportion of ≥1% by weight, preferably ≥5% by weight, more preferably ≥10% by weight, in particular ≥20% by weight, even more preferably ≥40% by weight and most preferably ≥50% by weight, based on the total resin system.

Particularly preferably, the resin system contains as component (i) a melamine urea formaldehyde resin, which is formed by mixing urea formaldehyde resins and melamine formaldehyde resins. While fundamentally any weight ratios of UF resin and MF resin can be used, for example in the range of 99:1 to 1:99, systems are preferred in which the UF resin forms the chief portion. Preferably, the proportion of UF resin to MF resin, respectively based on the weight, is > than 1.1:1, in particular > than 1.1:0.9, more preferably > than 1.5:1 and even more preferably > than 2:1.

In a further embodiment, a melamine urea formaldehyde resin (MUF resin) is composed as constituent (i), which is obtained by the action of formaldehyde on mixtures of melamine and urea, that is, a resin, which is formed by polycondensation of the monomeric starting materials.

In this embodiment the proportion of urea is also preferably greater than that of melamine, namely in particular >1.1:1, preferably >1.1:0.9 and more preferably >1.5:1.

The hybrid resin system according to the invention comprises as the second component (ii) an unsaturated polyester resin. Unsaturated polyesters are polyester condensates, which still contain at least one unsaturated C=C double bond. C=C double bonds of this type can be radically cross-linked. Fundamentally, any condensates of one or more difunctional or polyfunctional acids and one or more difunctional or polyfunctional alcohols can be used as polyesters, as long as at least one of the monomers used contains a double bond. Condensates have proven to be particularly suitable in which maleic acid is used as the acid component. Further suitable acids for producing the component (ii) comprise, for example, phthalic acid, tetrahydrophthalic acid, terephthalic acid and/or the anhydrides thereof, furthermore, fumaric acid. Moreover, mixtures of these acids and/or the anhydrides thereof as well as mixtures with adipic acid or sebacic acid can be used.

A glycol is preferably used as the alcohol component to form the unsaturated polyester, in particular monoethylene glycol, diethylene glycol, 1,2-propylene glycol, 2,3-butylene glycol or 1,3-butylene glycol and particularly preferably monoethylene glycol.

Further alcohols that can be used advantageously are, for example, sorbitol, neopentyl glycol, glycerol, trimethylolpropane, butanediol or hexanediol. Furthermore, mixtures of the listed alcohols can be used. Excess acid groups in the polyester resin can be neutralized for an improved adjustability of the reactivity in the hybrid resin system with organic and/or inorganic bases. Preferably amino bases, such as, for example, triethylamine or triethanolamine, are used.

The unsaturated polyester is particularly preferably a condensate of maleic acid and monoethylene glycol.

The resin system according to the invention can contain further polymeric constituents in addition to components (i) and (ii). However, resin systems are preferred, which in addition to components (i) and (ii) do not contain any other polymeric constituents, that is in particular constituents with a molecular weight >10,000 g/mol, for example >5,000 g/mol, preferably >1,000 g/mol and more preferably 500 g/mol.

The resin system according to the invention can contain any dispersion agents or solvents suitable for the resins used. Aqueous resin systems are preferred, which have a proportion of water of ≥5% by weight, more preferably ≥10% by weight based on the total weight. The resin system can contain further constituents, such as, for example, wetting agents, hardening agents and other additives and auxiliary agents, such as, for example, monoethylene glycol.

The resin system according to the invention can be used, for example, as a glue system with improved water resistance and adhesive force or for surface coatings.

The resin system according to the invention is suitable in particular for use as an impregnating resin for impregnating web-shaped materials of fiber raw materials. Web-shaped materials of this type are, for example, paper webs or fabric webs or non-woven fabrics. The web-shaped materials can thereby be formed of natural fibers and/or of artificial fibers, for example.

The use of the resin system is particularly favorable for impregnating web-shaped materials of fiber raw materials, which are used as counteracting layers, in particular in the production of laminate floors. Due to their technical properties and in particular their strength, it is possible with the resin system according to the invention to provide counteracting layers, which exhibit an excellent pulling effect with the application of relatively small amounts of resin. The resin application is thereby usually between 50 and 150 g/m², more preferably 60-100 g/m². The impregnant weight is thereby usually between 50 and 250 g/m², more preferably between 100 and 200 g/m².

The subject matter of the present invention is also a web-shaped material of fiber raw materials, in particular as described above, impregnated with a resin system according to the invention. Preferably, paper is used as the web-shaped material, in particular with a weight per unit area of 30-140 g/m², in particular of 40-100 g/m².

Finally, the invention also relates to a multilayer board comprising a material board, which is coated on its visible surface with at least one paper layer impregnated with resin, and on the opposite side of the material board is coated with at least one counteracting layer impregnated with resin, wherein the at least one paper layer and/or the at least one counteracting layer is impregnated with a resin system according to the invention.

The material board is preferably a wood material board, for example, a chipboard or a fiberboard, preferably an MDF board (medium density fiberboard) or an HDF board (high density fiberboard) or an OSB board (oriented structural board). However, the material board can also be a continuous pressure laminate (CPL) formed by placing several paper layers one on top of the other. The paper layer located on the visible surface of the multilayer board is preferably a visible paper layer and more preferably a decorative paper layer. The visible paper layer preferably has a raw paper smoothness measured according to Bekk of at least 20s, preferably of at least 25s. The visible paper layer can have, for example, a weight per unit area of approx. 30 g/m², in particular of 40-140 g/m².

The counteracting layer is preferably a web-shaped material of fiber raw materials, as previously described herein, impregnated or soaked with a resin. The resin system according to the invention can be used in order to impregnate the visible paper layer, the counteracting layer or both layers. Preferably, at least the counteracting layer is impregnated with a resin system according to the invention. The resin systems according to the invention have an excellent pulling effect in counteracting layers.

The impregnation of web-shaped materials of fiber raw materials and the formation of multilayer boards can be carried out according to the invention, for example, by means of high-pressure presses or low-pressure presses. For example, multidaylight presses, short-cycle presses or continuous presses, such as, e.g., continuous band presses, are suitable.

The invention also provides for a resin system comprising a melamine urea formaldehyde resin and an unsaturated polyester resin.

In embodiments, either the melamine urea formaldehyde resin is formed by mixing urea formaldehyde resin and melamine formaldehyde resin and/or or the melamine urea formaldehyde resin comprises a mixture of urea formaldehyde resin and melamine formaldehyde resin.

In embodiments, a proportion of urea formaldehyde resin to melamine formaldehyde resin is more than 1.1:0.9, based on weight.

In embodiments, the melamine urea formaldehyde resin is obtained by formaldehyde acting on a mixture of melamine and urea.

In embodiments, the unsaturated polyester resin is a condensate of maleic acid and glycols.

In embodiments, a method is provided for impregnating a web-shaped material with the resin system described above, wherein the method comprises applying to the web-shaped material at least one coating or layer, wherein the at least one coating or layer comprises a melamine urea formaldehyde resin and an unsaturated polyester resin.

In embodiments, the web-shaped material is at least one of a paper web, a fabric web, and a non-woven fabric.

In embodiments, the web-shaped material is at least one of a web-shaped material of fiber raw material and a paper web for coating a board-shaped material with a pressure press.

In embodiments, the web-shaped material is at least one of a counteracting layer and a laminate floor counteracting layer.

In embodiments, there is provided a web-shaped material comprising a fiber raw material impregnated with the resin system described above.

In embodiments, there is provided a web-shaped material comprising a layer of fiber raw material comprising opposite sides and at least one of the opposite sides being impregnated with the resin system described above.

In embodiments, there is provided a multilayer board comprising a material board comprising a visible surface side and an opposite side, at least one paper layer impregnated with resin arranged on the visible surface side, at least one counteracting layer impregnated with resin arranged on the opposite side, wherein at least one of the impregnated resin of the at least one paper layer comprises the resin system described above and the impregnated resin of the at least one counteracting layer comprises the resin system described above.

In embodiments, there is provided a multilayer board comprising a material board comprising a visible surface side and an opposite side, at least one paper layer impregnated with resin arranged on the visible surface side, at least one counteracting layer impregnated with resin arranged on the opposite side, wherein the impregnated resin of the at least one counteracting layer comprises the resin system described above.

In embodiments, there is provided a hybrid resin comprising at least two components, a first of said at least two components comprising a melamine urea formaldehyde resin (MUF resin), and a second of said at least two components comprising an unsaturated polyester resin, wherein the first component is a polycondensate and the second component is polyester condensate.

In embodiments, the first component contains at least a certain proportion of resin derived from ≥50% by weight urea based on a total of the hybrid resin.

In embodiments, the first component of melamine urea formaldehyde resin is formed by mixing urea formaldehyde resins and melamine formaldehyde resins (UF resin) with the UF resin forming a chief portion.

In embodiments, the first component of melamine urea formaldehyde resin is composed as constituent which is obtained by action of formaldehyde on mixtures of melamine and urea and which is formed by polycondensation of monomeric starting materials.

In embodiments, the second component is an unsaturated polyester resin made from polyester condensate which still contains at least one unsaturated C=C double bond.

In embodiments, the second component is an unsaturated polyester resin made from a condensate of one or more difunctional or polyfunctional acids and one or more difunctional or polyfunctional alcohols with at least one of the monomers used containing a double bond.

In embodiments, there is provided a floor material comprising a board material comprising a visible surface side and an opposite side, at least one counteracting layer impregnated with resin arranged on the opposite side, wherein at least the impregnated resin of the at least one counteracting layer comprises the hybrid resin described above.

BRIEF DESCRIPTION OF THE DRAWINGS

The invention is explained in more detail below with reference to the following FIGURE(S) wherein:

FIG. 1 shows a roughly diagrammatic sectional representation to explain the fundamental structure of a multilayer board according to the invention.

DETAILED DESCRIPTION OF THE INVENTION

The invention is explained further based on the following examples and the attached FIGURE.

FIG. 1 shows a roughly diagrammatic sectional representation to explain the fundamental structure of a multilayer board 100 according to the invention. A material board 20, which comprises, for example, a wood material board, for example a chipboard or a fiberboard, preferably an MDF board or an HDF board, or an OSB board, or a high-pressure laminate board formed by placing several paper layers one on top of the other, is hereby coated with a paper layer 30 impregnated with a resin, which is in particular a visible paper layer.

A counteracting layer 40 is arranged on the other side of the material board 20, which counteracting layer 40 is likewise impregnated with a resin. This counteracting layer counteracts the pulling effect exerted by the visible paper layer impregnated with resin. According to the invention, at least one of the layers paper layer 30 and counteracting layer 40 is impregnated with a hybrid resin according to the invention.

EXAMPLE 1

Hybrid Resin System

A resin system according to the invention is formed by
61 g urea resin (commercially available)
29 g melamine resin (commercially available)
13 g polyester condensate of maleic acid anhydride and monoethylene glycol, molar mass approx. 1000 g/mol
25 g water
0.4 g wetting agent, 1.8 g hardening agent, 5 g monoethylene glycol

EXAMPLE 2

Resin System Comparison Example

A resin system without polyester condensate was formed from the following starting materials:
61 g urea resin (commercially available)
29 g melamine resin (commercially available)
25 g water
0.4 g wetting agent, 1.0 g hardening agent (same gel time), 5 g monoethylene glycol

EXAMPLE 3

Standard Impregnation

A commercially available impregnating resin for counteracting layers is composed as follows:
100 g melamine resin
25 g water
0.4 g wetting agent, 0.6 g hardening agent (same gel time), 5 g monoethylene glycol A counteracting impregnant with a resin application of 100 g/m² and a residual moisture of 6.5% is produced with the described resin with commercially available paper with a weight per unit area of 80 g/m².

EXAMPLE 4

Pulling Action Test

Commercially available paper with a weight per unit area of 80 g/m² was impregnated with the hybrid resin system according to the invention according to example 1 as well as the comparison resin system according to example 2. The impregnant was dried at 160° C. to a residual moisture of 6.5%. The resin application was 100 g/m². The impregnants were pressed on a short cycle press at 180° C. for 30 seconds to form a high-density fiber board (HDF). On the opposite side of the high-density fiber board the standard impregnation according to example 3 was respectively applied. After the samples had cooled, the warpage was measured in mm/200 mm coating was determined.

It was shown that the board of the comparison example was warped in the direction of the commercially available counteracting impregnant due to a stronger pulling action of the counteracting impregnant. In contrast thereto, the board coated with the paper impregnated with the hybrid resin according to example 1 was curved in the direction of the test impregnant (curvature +0.1 mm/200 mm). It was therefore possible to achieve a stronger pulling action with the same use of resin.

The invention claimed is:

1. A resin system comprising:
   a melamine urea formaldehyde resin, wherein a proportion of urea formaldehyde resin to melamine formaldehyde resin is more than 1.1:0.9, based on weight, and wherein the melamine urea formaldehyde resin is a mixture of urea-formaldehyde resins and melamine-formaldehyde resins;
   an unsaturated polyester resin, which is a condensate of maleic acid and monoethylene glycol; and
   no other polymeric constituents.

2. A method of impregnating a web-shaped material with the resin system of claim 1, the method comprising:
   applying to the web-shaped material at least one coating or layer,
   wherein the at least one coating or layer comprises the melamine urea formaldehyde resin, wherein a proportion of urea formaldehyde resin to melamine formaldehyde resin is more than 1.1:0.9, based on weight, and wherein the melamine urea formaldehyde resin is a mixture of urea-formaldehyde resins and melamine-formaldehyde resins; the unsaturated polyester resin, which is a condensate of maleic acid and monoethylene glycol; and no other polymeric constituents.

3. The method of claim 2, wherein the web-shaped material is at least one of:
   a paper web;
   a fabric web; and
   a non-woven fabric.

4. The method of claim 2, wherein the web-shaped material is at least one of:
   a web-shaped material of fiber raw material; and
   a paper web for coating a board-shaped material with a pressure press.

5. The method of claim 2, wherein the web-shaped material is at least one of:
   a counteracting layer; and
   a laminate floor counteracting layer.

6. A web-shaped material comprising:
   a fiber raw material impregnated with the resin system of claim 1.

7. A web-shaped material comprising:
   a layer of fiber raw material comprising opposite sides; and
   at least one of the opposite sides being impregnated with the resin system of claim 1.

8. A multilayer board comprising:
   a material board comprising a visible surface side and an opposite side;
   at least one paper layer impregnated with resin arranged on the visible surface side;
   at least one counteracting layer impregnated with resin arranged on the opposite side,
   wherein at least one of:
   the impregnated resin of the at least one paper layer comprises the resin system of claim 1; and
   the impregnated resin of the at least one counteracting layer comprises the resin system of claim 1.

9. A multilayer board comprising:
   a material board comprising a visible surface side and an opposite side;
   at least one paper layer impregnated with resin arranged on the visible surface side;
   at least one counteracting layer impregnated with resin arranged on the opposite side,
   wherein the impregnated resin of the at least one counteracting layer comprises the resin system of claim 1.

10. A hybrid resin comprising:
    at least two components;
    a first of said at least two components comprising melamine urea formaldehyde resin, wherein a proportion of urea formaldehyde resin to melamine formaldehyde resin is more than 1.1:0.9, based on weight, and wherein the melamine urea formaldehyde resin is a mixture of urea-formaldehyde resins and melamine-formaldehyde resins;
    a second of said at least two components comprising an unsaturated polyester resin, which is a condensate of maleic acid and monoethylene glycol; and no other polymeric constituents,
    wherein the first component is a polycondensate and the second component is polyester condensate.

11. The hybrid resin of claim 10, wherein the first component contains at least a certain proportion of resin derived from ≥50% by weight urea based on a total of the hybrid resin.

12. The hybrid resin of claim 10, wherein the second component is an unsaturated polyester resin made from polyester condensate which still contains at least one unsaturated C=C double bond.

13. A floor material comprising:
    a board material comprising a visible surface side and an opposite side;
    at least one counteracting layer impregnated with resin arranged on the opposite side,
    wherein at least the impregnated resin of the at least one counteracting layer comprises the hybrid resin of claim 10.

* * * * *